(12) United States Patent
Kämmler et al.

(10) Patent No.: US 7,721,792 B2
(45) Date of Patent: May 25, 2010

(54) EXHAUST GAS HEAT EXCHANGER

(75) Inventors: Georg Kämmler, Stuttgart (DE); Jürgen Rosin, Remshalden (DE)

(73) Assignee: BEHR GmbH & Co. KG, Stuttgart (DE)

( * ) Notice: Subject to any disclaimer, the term of this patent is extended or adjusted under 35 U.S.C. 154(b) by 13 days.

(21) Appl. No.: 12/064,894

(22) PCT Filed: Jul. 19, 2006

(86) PCT No.: PCT/EP2006/007090
§ 371 (c)(1),
(2), (4) Date: Apr. 4, 2008

(87) PCT Pub. No.: WO2007/025610
PCT Pub. Date: Mar. 8, 2007

(65) Prior Publication Data
US 2008/0223024 A1    Sep. 18, 2008

(30) Foreign Application Priority Data
Aug. 27, 2005  (DE) .................. 10 2005 040 612

(51) Int. Cl.
*F28F 27/02* (2006.01)
*F28F 21/06* (2006.01)
(52) U.S. Cl. ...................... 165/103; 165/135
(58) Field of Classification Search ............ 165/103, 165/133, 135
See application file for complete search history.

(56) References Cited

U.S. PATENT DOCUMENTS

| 5,400,588 | A  | * | 3/1995  | Yamane et al. ........... 60/39.465 |
| 6,338,366 | B1 | * | 1/2002  | Williams .................... 138/149 |
| 6,341,648 | B1 | * | 1/2002  | Fukuoka et al. ............. 165/144 |
| 6,460,576 | B2 | * | 10/2002 | Vitoorapakorn ............. 138/149 |
| 6,718,956 | B2 | * | 4/2004  | Klipfel et al. .......... 123/568.12 |
| 6,843,950 | B1 | * | 1/2005  | Blome et al. ................ 264/276 |
| 7,032,577 | B2 | * | 4/2006  | Rosin et al. ............ 123/568.12 |
| 7,168,419 | B2 |   | 1/2007  | Rosin et al. |
| 2004/0182547 | A1 | * | 9/2004 | Birkert et al. ................. 165/83 |
| 2006/0032613 | A1 | * | 2/2006 | Brost et al. ................. 165/103 |
| 2006/0124114 | A1 | * | 6/2006 | Sayers et al. ........... 123/568.12 |
| 2008/0035309 | A1 | * | 2/2008 | Beck et al. .................. 165/103 |

FOREIGN PATENT DOCUMENTS

| DE | 90 16 792 U1  | 4/1991  |
| DE | 199 62 863 A1 | 6/2001  |
| DE | 102 03 003 A1 | 8/2003  |
| EP | 13 67 253 A1  | 12/2003 |

\* cited by examiner

*Primary Examiner*—Allen J Flanigan
(74) *Attorney, Agent, or Firm*—Foley & Lardner LLP

(57) ABSTRACT

The invention relates to an exhaust gas heat exchanger comprising a bundle of pipes which consists of exhaust gas pipes and a bypass channel, and a housing which can be cross-flown by an aqueous cooling agent. The bundle of pipes and the bypass channel joins in a common exhaust gas inlet, wherein an exhaust gas valve is arranged for controlling the exhaust gas flow through the bundle of pipes or the bypass channel. According to the invention, the bypass channel is embodied as a special steel tube (10) comprising a covering (11) which is made of a high-temperature resistant plastic and wherein the housing, which can be cross-flown by the cooling agent, is arranged.

19 Claims, 2 Drawing Sheets

EXHAUST GAS HEAT EXCHANGER

The invention relates to an exhaust gas heat exchanger having a tube bundle of exhaust tubes and having a bypass duct.

BACKGROUND OF THE INVENTION

Exhaust gas heat exchangers are known—in particular in motor vehicles—as exhaust gas heaters, so-called additional heaters or as exhaust gas coolers. DE-A 199 62 863 from the applicant has disclosed an exhaust gas heat exchanger which can be used in particular as an additional heater in motor vehicles with consumption-optimized engines, in order to compensate the heating heat deficit of said engines. The exhaust gas dissipates its heat via a tube bundle of exhaust gas tubes to the coolant which flows through the heating body of the vehicle heater. In the event that the exhaust gas heating is no longer required, an exhaust gas valve switches the exhaust gas flow such that it flows through a bypass duct which is thermally insulated from the exhaust gas tubes, by means of a partition which largely suppresses any heating effect. The exhaust gas tubes are thus arranged in a housing which is traversed by coolant, while the bypass duct is accommodated in a separate, thermally insulated space. An advantage of said solution is the integration of the exhaust gas tubes and bypass duct; a disadvantage is the space-consuming thermal insulation of the bypass duct.

DE-A 102 03 003 has disclosed an exhaust gas heat exchanger which can be used predominantly as an exhaust gas cooler in an exhaust gas recirculation system (EGR system). Here, exhaust gas is extracted from an exhaust gas line of the internal combustion engine, is cooled in the exhaust gas cooler by the coolant of the coolant circuit, and is supplied back to the engine for complete combustion. Here, too, a bypass duct is connected parallel to a tube bundle of exhaust gas tubes, with the exhaust gas flow being conducted either through the tube bundle for the purposes of cooling or through the bypass duct in the case of non-cooling.

SUMMARY OF THE INVENTION

It is an object of the present invention, in an exhaust gas heat exchanger of the type specified in the introduction, to improve and to simplify the thermal insulation and to configure the latter in as space-saving a manner as possible.

According to the invention, it is provided that the exhaust gas tubes and the bypass duct are arranged in a housing which can be traversed by coolant, and that the bypass duct is thermally insulated by means of a plastic casing. On account of the relatively high exhaust gas temperatures, the plastic is resistant to high temperatures, for example PTFE or PI. In this way, the advantage is obtained that it is possible to dispense with two separate spaces with a partition, and for effective thermal insulation to be obtained in the smallest installation space. The bypass duct can therefore be arranged in the direct vicinity of the exhaust gas tubes, and can therefore also have coolant flow around them, with said bypass duct, on account of its insulation, dissipating no heat or little heat to the coolant when it is traversed by hot exhaust gases.

In a further advantageous embodiment of the invention, the bypass duct is embodied as a high-grade steel tube, preferably with an oval cross section, that is to say matching the tube bundle of exhaust gas tubes. The wall thickness of the high-grade steel tube is advantageously approximately 0.4 mm, so that welding to the tube plates is also possible.

In one advantageous refinement of the invention, the plastic casing is slightly shorter than the length of the high-grade steel tube, so that the plastic casing is not thermally damaged during the welding of the high-grade steel tube to the tube plates. The welding preferably takes place by means of laser beams, so that only a locally very restricted zone in the region of the tube/plate connection is heated.

In one advantageous refinement of the invention, the plastic casing is embodied either as a single-piece tube or as a tube which is composed of two joined half-shells. Here, a single-piece, for example extruded plastic tube, is particularly cheap. A two-part tube, in contrast, can also be assembled after the welding to the tube plates.

In one advantageous refinement of the invention, so-called degassing bores are arranged in the plastic casing, preferably on the upper side and on the underside of the casing. A slight gap is generated between the outer face of the high-grade steel tube and the inner face of the plastic casing, which gap is filled with coolant which is caused to evaporate as a result of the high exhaust gas temperatures. The coolant vapor generated in this way on the one hand has an insulating effect, but should on the other hand escape to the outside through the degassing bores in order to prevent damage.

According to one advantageous refinement of the invention, the wall thickness of the plastic casing is approximately 1.5 mm. This therefore results in the advantage of effective thermal insulation in the smallest installation space.

BRIEF DESCRIPTION OF THE DRAWINGS

One exemplary embodiment of the invention is illustrated in the drawing and is described in more detail below. In the drawing.

DETAILED DESCRIPTION

Figure 1:
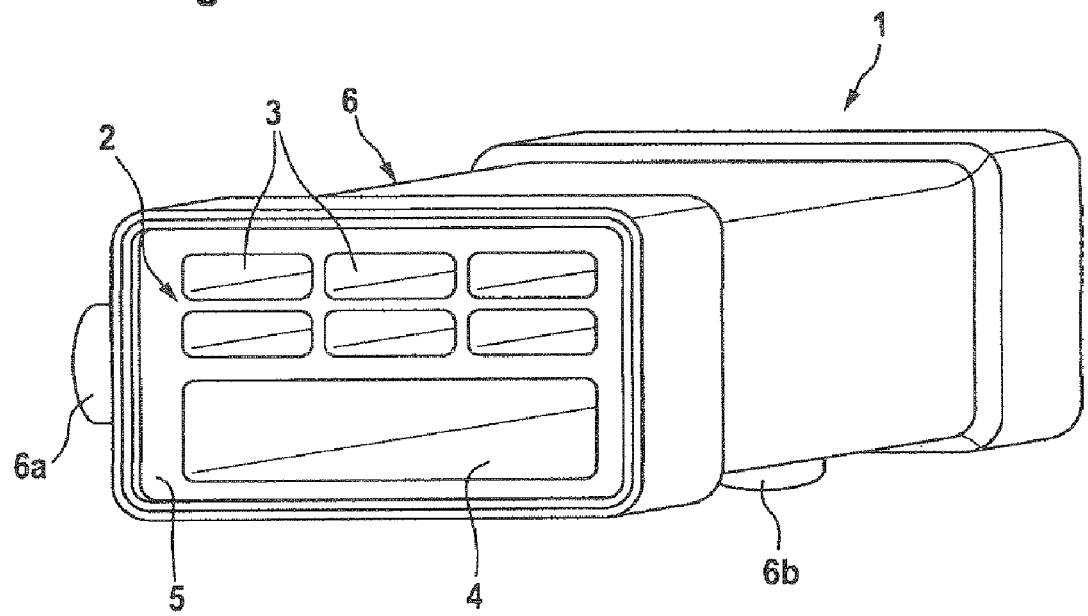
FIG. 1 shows an exhaust gas cooler in a perspective view.

FIG. 1 shows a known exhaust gas cooler 1 for an exhaust gas recirculation system for vehicle engines. The exhaust gas cooler 1 is described in more detail in DE-A 102 03 003 which is included in its entirety in the content of disclosure of this application. The exhaust gas cooler 1 substantially has a tube bundle 2 of exhaust gas tubes 3 and a bypass tube 4 which are welded at the end side in a tube plate 5. The opposite tube plate (not illustrated) is of similar design, that is to say that there, too, the exhaust gas tubes 3 and the bypass tube 4 are welded and thereby sealed off. Arranged between the tube plates is a housing 6 which is traversed by coolant; said housing 6 therefore has coolant connections 6a, 6b which are connected to a coolant circuit (not illustrated) of the internal combustion engine of the motor vehicle. All the parts of the exhaust gas cooler 1 are preferably produced from high-grade steel.

Figure 2:
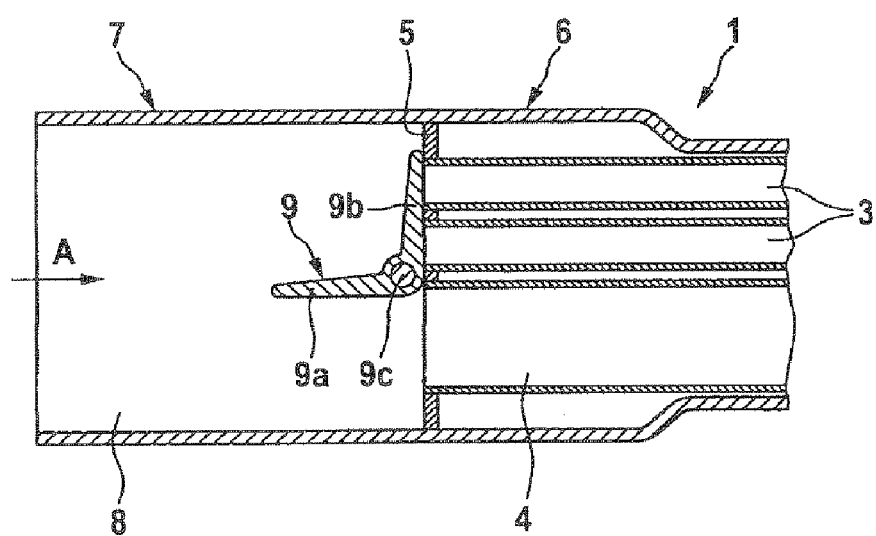
FIG. 2 shows the exhaust gas cooler as per FIG. 1 in section with an exhaust flap and FIG. 3 shows a plastic-encased bypass tube for the exhaust gas cooler.

FIG. 2 shows a longitudinal section through the exhaust gas cooler 1 with the housing 6, which housing 6 is extended beyond the tube plate 5 to form an exhaust gas inlet connecting pipe 7 which forms an exhaust gas inlet region 8. The inlet of the exhaust gas flow is illustrated by an arrow A. Arranged in the exhaust gas inlet region 8 directly upstream of the tube plate 5 is a pivotable flap 9 which has two closing faces 9a, 9b arranged at an angle and which is pivotable about a pivot axis 9c. The position of the exhaust gas flap 9 is brought about by an actuating motor (not illustrated). In the flap position illustrated, the exhaust gas tubes 3 are closed off, while the cross section of the bypass tube 4 is fully open. In the other flap position (not illustrated), the limb 9a closes off the bypass duct 4, and at the same time the cross sections of the exhaust gas tubes 3 are opened—cooling of the exhaust gases by the coolant which flows through the housing 6 is thereby effected. The two illustrations in FIG. 1 and FIG. 2 correspond—as mentioned—to the abovementioned prior art, in particular with regard to the design of the bypass duct 4.

Figure 3:
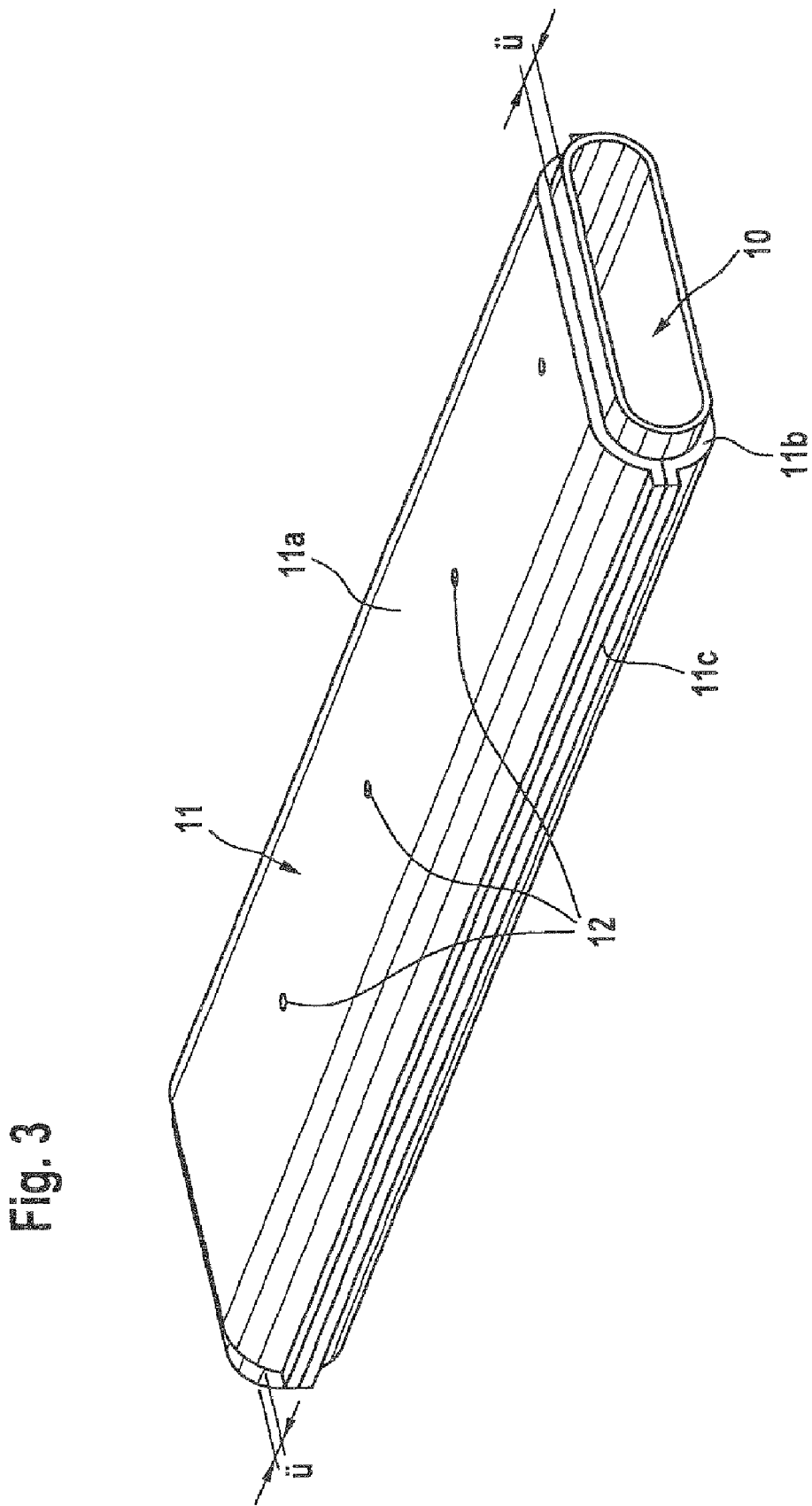

FIG. 3 shows an encased bypass tube 10 according to the invention, which replaces the bypass tube 4 according to the prior art in FIG. 1 and FIG. 2. The bypass tube 10 is produced from high-grade steel and has for example a material thickness of 0.4 mm and a cross section which corresponds to the known bypass tube (in relation to the exhaust gas tubes 3). The cross section is—as can be seen from the drawing—oval, that is to say with two flat sides and two rounded narrow sides. The bypass tube 10 is surrounded by a casing 11 composed of high-temperature-resistant plastic, for example PTFE or PI, with the casing 11 bearing tightly, that is to say with a press fit or close sliding fit, against the outer periphery of the bypass tube 10. The casing 11 encloses the entire periphery of the bypass tube; with regard to length, however, the casing 11 is shorter than the bypass tube 10, which has a projecting length ü with respect to the casing 11 at the end side in each case. Said projecting length ü is provided for production reasons, because the end sides of the bypass tube 10 are plugged into the tube plates and are welded there. During the welding, no impermissible heating of the plastic casing 11 should occur. The welded connection is preferably formed by means of laser welding, so that only a locally intensely restricted generation of heat is to be expected. The plastic casing 11 therefore extends, in the installed state of the bypass tube 10, almost directly to the tube plates, so that virtually complete insulation of the bypass tube 10 is given by the plastic casing 11. The material thickness of the plastic casing is approximately 1.5 mm. The plastic casing 11 can be formed either in one piece as an extruded plastic tube or can be produced from two half-shells 11a, 11b as illustrated in the drawing. In the case of a two-part design, the two half-shells 11a, 11b are connected to one another at their longitudinal sides, that is to say the narrow sides of the bypass tube 10, by means of a flange 11c. A plurality of degassing bores 12 with a diameter of approximately 2 mm are arranged in the upper and the lower half-shell 11a, 11b of the plastic casing 11. The degassing bores 12 create a connection between a gap (not illustrated) between the plastic casing 11 and the exhaust tube 10, which gap is filled with cooling during operation of the exhaust gas cooler. The coolant evaporates when hot exhaust gas flows through the bypass tube 10. The coolant vapor can escape outward through the degassing bores 12 into the coolant, and it is prevented that an excessively high pressure builds up within the plastic casing 11. At the same time, additional thermal insulation is created by means of said evaporation of the coolant in the gap between the plastic casing 11 and the bypass tube 10.

By means of the design of the bypass tube 10 according to the invention, that is to say by means of the plastic casing 11, it is possible both for the exhaust gas tubes 3 and also the bypass tube 10 together with the casing 11 to be arranged together in the housing 6 which is traversed by coolant, without a partition being necessary within the housing 6 for insulating the bypass duct. This results in a space-saving design with simultaneously effective thermal insulation.

The invention claimed is:

1. An exhaust gas heat exchanger comprising:
   a tube bundle of exhaust gas tubes; and
   a bypass duct, having a housing which can be traversed by a liquid coolant, wherein the tube bundle and the bypass duct in each case open out into a common exhaust gas inlet region in which is arranged an exhaust gas valve configured to control an exhaust gas flow through the tube bundle or through the bypass duct,
   wherein the bypass duct comprises a metal tube with a high-temperature-resistant plastic casing, wherein the bypass duct is arranged in the housing which can be traversed by the coolant;
   wherein the casing includes at least one degassing bore.

2. The exhaust gas heat exchanger as claimed in claim 1, wherein a cross section of the tube is oval.

3. The exhaust gas heat exchanger as claimed in claim 1, wherein the tube has a wall thickness of approximately 0.4 mm.

4. The exhaust gas heat exchanger as claimed in claim 1, wherein tube plates are arranged in the exhaust gas inlet region and in an exhaust gas outlet region, and ends of the tube are welded to the tube plates.

5. The exhaust gas heat exchanger as claimed in claim 1, wherein the casing is shorter than the tube, wherein the tube has a projecting length at each end of the tube.

6. The exhaust gas heat exchanger as claimed in claim 4, wherein the casing ends before the tube plates.

7. The exhaust gas heat exchanger as claimed in claim 1, wherein the casing is a tube and is configured to be pushed over the tube.

8. The exhaust gas heat exchanger as claimed in claim 7, wherein the casing is a single-piece tube.

9. The exhaust gas heat exchanger as claimed in claim 7, wherein the casing is a tube which is assembled from two half-shells.

10. The exhaust gas heat exchanger as claimed in claim 1, wherein a wall thickness of the casing is approximately 1.5 mm.

11. The exhaust gas heat exchanger as claimed in claim 1, wherein the at least one degassing bore has a diameter of approximately 2 mm.

12. The exhaust gas heat exchanger as claimed in claim 1, wherein the tube is a high-grade steel.

13. The exhaust gas heat exchanger as claimed in claim 1, wherein the tube and the casing form a gap between the tube and the casing.

14. The exhaust gas heat exchanger as claimed in claim 13, wherein the exhaust gas heat exchanger is configured such that the gap between the tube and the casing can be filled with coolant during operation of the exhaust gas heat exchanger,
   wherein the at least one degassing bore is configured to permit evaporated coolant to flow through the degassing bore and out of the casing.

15. The exhaust gas heat exchanger as claimed in claim 1, wherein degassing bores are arranged on opposite sides of the casing.

16. The exhaust gas heat exchanger as claimed in claim 1, wherein the casing has at least two flat sides and at least one degassing bore is arranged on each of the flat sides.

17. An exhaust gas heat exchanger comprising:
   a tube bundle of exhaust gas tubes; and
   a bypass duct having a housing which can be traversed by a liquid coolant, wherein the tube bundle and the bypass duct in each case open out into a common exhaust gas inlet region in which is arranged an exhaust gas valve configured to control an exhaust gas flow through the tube bundle or through the bypass duct, wherein the bypass duct comprises a metal tube with a high-temperature-resistant plastic casing, wherein the bypass duct is arranged in the housing;

wherein the tube and the casing form a gap between the tube and the casing.

18. The exhaust gas heat exchanger as claimed in claim 1, wherein the exhaust gas heat exchanger is configured such that the gap between the tube and the casing can be filled with coolant during operation of the exhaust gas heat exchanger.

19. The exhaust gas heat exchanger as claimed in claim 18, wherein the casing includes at least one degassing bore, wherein the at least one degassing bore is configured to permit evaporated coolant to flow through the degassing bore and out of the casing from the gap formed between the tube and the casing.

* * * * *